(12) United States Patent
Tanaka et al.

(10) Patent No.: US 6,398,420 B1
(45) Date of Patent: Jun. 4, 2002

(54) ROLLING BEARING DEVICE

(75) Inventors: Susumu Tanaka; Hiroyuki Ito, both of Kanagawa (JP)

(73) Assignee: NSK, Ltd., Tokyo (JP)

(*) Notice: Subject to any disclaimer, the term of this patent is extended or adjusted under 35 U.S.C. 154(b) by 0 days.

(21) Appl. No.: 09/867,636

(22) Filed: May 31, 2001

(30) Foreign Application Priority Data

May 31, 2000 (JP) .................................... 2000-161337
Jul. 6, 2000 (JP) .................................... 2000-204802
Dec. 15, 2000 (JP) .................................... 2000-382732

(51) Int. Cl.$^7$ ............................................. F16C 33/62
(52) U.S. Cl. .................. 384/625; 148/318; 148/319; 148/906; 216/52; 216/53; 384/492; 384/548; 384/912; 428/469; 428/702; 428/908.8; 428/926
(58) Field of Search .................. 428/469, 702, 428/908.8, 926; 148/318, 319, 906; 216/52, 53; 384/625, 548, 492, 912

(56) References Cited

U.S. PATENT DOCUMENTS 6,315,455 B1 * 11/2001 Tanaka et al. ............. 384/625

FOREIGN PATENT DOCUMENTS

JP          7-278762 A  * 10/1995

* cited by examiner

*Primary Examiner*—Robert R. Koehler
(74) *Attorney, Agent, or Firm*—Sughrue Mion, PLLC

(57) ABSTRACT

The material of inner ring, outer ring and rolling element is formed by a steel material having a chromium (Cr) content of 5% by weight or more. The material is then subjected to cutting. Thereafter, the material thus cut is subjected to heat treatment so that the surface hardness HRC of the worked material is 58 or more. Subsequently, the worked material is subjected to grinding. A working denatured layer present on the surface of the worked material is then removed. Subsequently, an oxide film comprising chromium atom and iron atom at a ratio (Cr/Fe) of 0.5 or more is formed on the surface of the worked material. Accordingly, it is possible to provide a rolling bearing excellent in corrosion resistance and fretting resistance.

13 Claims, 4 Drawing Sheets

ROLLING BEARING DEVICE

BACKGROUND OF THE INVENTION

The present invention relates to a rolling bearing device such as rolling bearing, ball screw and linear guide. More particularly, the present invention relates to a rolling bearing device suitable for precision machine, food-processing machine, facilities for producing semiconductor element or liquid crystal panel, medical examination equipment, medical equipment having a rotary portion such as dental hand piece, fishing equipment, etc.

The present invention further relates to a rolling bearing device which is used at a high temperature and a high rotary speed such as those for aircraft jet engine, gas turbine and transmission.

A rolling bearing device for precision machine, food-processing machine, facilities for producing semiconductor element or liquid crystal panel, medical examination equipment, fishing equipment, etc. is a device subject to use in a rusting atmosphere or a device which is not allowed to undergo even slight rusting. Therefore, the constituents of such a rolling bearing have heretofore been formed by SUS440C, which is a martensite-based steel, 0.7C-13 Cr stainless steel, etc. These stainless steels are superior to SUJ2 and SCRR420, which are used as constituents of ordinary rolling bearing devices, in respect to corrosion resistance. When subjected to hardening, these stainless steels can be provided with a surface hardness of 58 or more, which is necessary for constituents of rolling bearing device, as calculated in terms of HRC (Rockwell C hardness).

However, with the recent further diversification of working atmosphere of rolling bearing device, there has been a growing demand for corrosion resistance, rolling fatigue life and reliability. Thus, the foregoing rolling bearing device comprising SUS440C or 0.7C-13Cr stainless steel cannot occasionally meet sufficiently these requirements.

For example, data equipment have been recently miniaturized more and more and thus often used in portable form that adds to possibility of being impacted when dropped or exposed to vibration. When given minute vibration or oscillation, the rolling bearing in the equipment undergoes fretting at the contact area of rolling element with bearing ring (repeated minute relative slippage of two contacting surfaces that causes abrasion), causing deterioration of acoustic properties.

A first object of the present invention is to provide a rolling bearing device excellent in corrosion resistance and fretting resistance, paying attention to the foregoing problem.

On the other hand, a rolling bearing for aircraft jet engine or gas turbine operates at a high temperature and a high rotary speed. Therefore, such a rolling bearing is required to have a sufficient resistance to hoop stress on the core thereof or have a sufficient surface hardness at high temperatures in addition to rolling fatigue life and abrasion resistance. Accordingly, as a rolling bearing material for such a purpose there has heretofore been used a high-speed steel such as AISI-M50 and M50NiL, which are excellent in heat resistance. M50NiL, if used, is subjected to surface hardening such as carburizing.

However, these high-speed steel materials are inferior to stainless steel in respect to corrosion resistance. In particular, a rolling bearing for aircraft jet engine can be easily wet with dew and thus rusted because most airports are located close to sea or it is used in an atmosphere having a big change of temperature and humidity. Further, since importance is attached to safety in the art of aircraft, the occurrence of slight rust can be judged as termination of bearing life.

Accordingly, a rolling bearing for aircraft jet engine is required to have an improved corrosion resistance. However, the foregoing stainless steel such as SUS440C not only cannot provide a sufficient resistance to hoop stress or a sufficient hardness at high temperatures but also leaves something to be desired in corrosion resistance.

On the other hand, JP-A-7-278762 (The term "JP-A" as used herein means an "unexamined published Japanese patent application") discloses that when a stainless steel having a predetermined composition and having a carbon content as low as 0.03% by weight or less (preferably 0.02% by weight or less) is subjected to surface hardening by nitriding instead of carburizing, the corrosion resistance of the surface portion of the stainless steel can be improved while maintaining a sufficient core roughness and surface hardness. However, nitriding can difficultly make much nitrogen to penetrate into the surface portion of the stainless steel, making it impossible to obtain a surface hardness equal to or higher than that obtained with M50 by carburizing. Accordingly, the method disclosed in this patent leaves something to be desired in life properties during use at a high temperature and a high rotary speed.

A second object of the present invention is to provide a rolling bearing device having a prolonged life during use at a high temperature and a high rotary speed and an excellent corrosion resistance, paying attention to the foregoing problem.

Further, the recent trend is for more bearings for dental hand piece to be operated at a ultrahigh rotary speed as 400,000 to 500,00 rpm. It has been thus apprehended that the resulting early damage or seizing on the rolling surface can cause the reduction of bearing life. In order to prevent the infection of HIV virus, it has recently been practice to sterilize a dental hand piece with vapor at a temperature of about 135° C. for several minutes every use. Thus, a dental hand piece has been required to have higher corrosion resistance. Accordingly, a bearing or dental hand piece formed by a martensite-based stainless feel can leave something to be desired in corrosion resistance.

A still further object of the invention is to provide a rolling bearing device having excellent corrosion resistance and seizing resistance suitable for such a dental hand piece.

SUMMARY OF THE INVENTION

The above-mentioned object can be achieved by a rolling bearing device, according to a first aspect of the present invention, comprising:

a fixed body having a race;

a moving body having a race; and a rolling elements rotatably interposed between the races of the fixed body and the moving body so as to make the moving body movable relative to the fixed body, wherein the at least one of the fixed body and the moving body is obtained by working a material made of iron alloy steel having a chromium (Cr) content of from equal or more than 5% by weight to equal or less 22% by weight into a predetermined shape, and then subjecting the material to heat treatment followed by finishing, and then the race of at least one of the fixed body and the moving body thus finished has a surface hardness HRC 58 or more, and wherein an oxide film is formed on the race of the at least one of the fixed body and moving body and also comprises chromium atom and iron atom present therein at a ratio (Cr/Fe) of 0.5 or more.

In addition to this, the above-mentioned object can also be achieved by a rolling bearing device, according to a second aspect of the present invention, comprising:

a fixed body having a race;

a moving body having a race;

a rolling elements rotatably interposed between the races of the fixed body and the moving body so as to make the moving body movable relative to the fixed body, wherein at least one of the fixed body and the moving body is obtained by working a material into a predetermined shape, the material being made of alloy steel containing, 0.2% or less by weight of C; 0.1% to 2.0% by weight of Si; 10.0% to 20.0% by weight of Cr; 0.4% to 3.0% by weight of Mo; 1.0% to 3.5% by weight of Ni; 1.0% to 10.0% by weight of Co; and 0.4% to 2.0% by weight of V, and being subjected to heat treatment including carburizing or carbonitriding followed by finishing, wherein the at least one of the fixed body and the moving body has a surface portion at its race, the surface portion having the carbon content from 1.0% to 3.0% by weight at its race, the surface hardness of the surface portion is equal or more than HRC 62, and an oxide film is formed on the at least one of the fixed body and moving body and also comprises chromium atom and iron atom present therein at a ratio (Cr/Fe) of not lower than 0.5, the oxide film having a thickness of not lower than 10 Å.

DETAILED DESCRIPTION OF THE PREFERRED EMBODIMENTS

Hereinafter, a rolling bearing device according to preferred embodiments of the present invention will be explained in accompany with drawings.

[First Rolling Bearing Device]

In order to accomplish the foregoing first object of the invention, the present invention provides a rolling bearing device comprising as constituents provided interposed between a fixed body and a moving body rolling elements and race members having a race for the rolling elements fixed to the fixed body and the moving body, whereby the rolling movement of the rolling elements on the race allows the moving body to move relative to the fixed body, characterized in that at least one of the constituents is obtained by working a material made of iron steel material having a chromium (Cr) content of not lower than 5% by weight into a predetermined shape, subjecting the worked material to heat treatment to a surface hardness HRC of not lower than 58, and then subjecting the material to finishing so that an oxide film having chromium atom and iron atom present therein at a ratio (Cr/Fe) of 0.5 or more provided thereon. This rolling bearing device is defined as first rolling bearing device of the invention.

When the content of chromium (Cr) in the steel material used in the first rolling bearing device falls below 5% by weight, a good corrosion resistance cannot be obtained. The higher the content of chromium is, the better is corrosion resistance but the more easily can be produced δ-ferrite, which causes embrittlement. Therefore, the content of Cr is preferably not greater than 22.0% by weight.

Further, the relationship between the content [C] of carbon (C) and the content [Cr] of chromium (Cr) in the steel material used preferably satisfies the following relationship (1). In a steel material satisfying the following relationship (1), coarse eutectic carbides which cause deterioration of rolling life can be difficultly produced during the process of solidification. In order to make the surface hardness HRC of a steel material which doesn't satisfy the following relationship (1) 58 or more, the sum of the content of carbon and nitrogen in the steel material (C+N) is predetermined to be 0.45% by weight or more.

$$[C] \leq -0.05[Cr] + 1.41 \tag{1}$$

Figure 5:
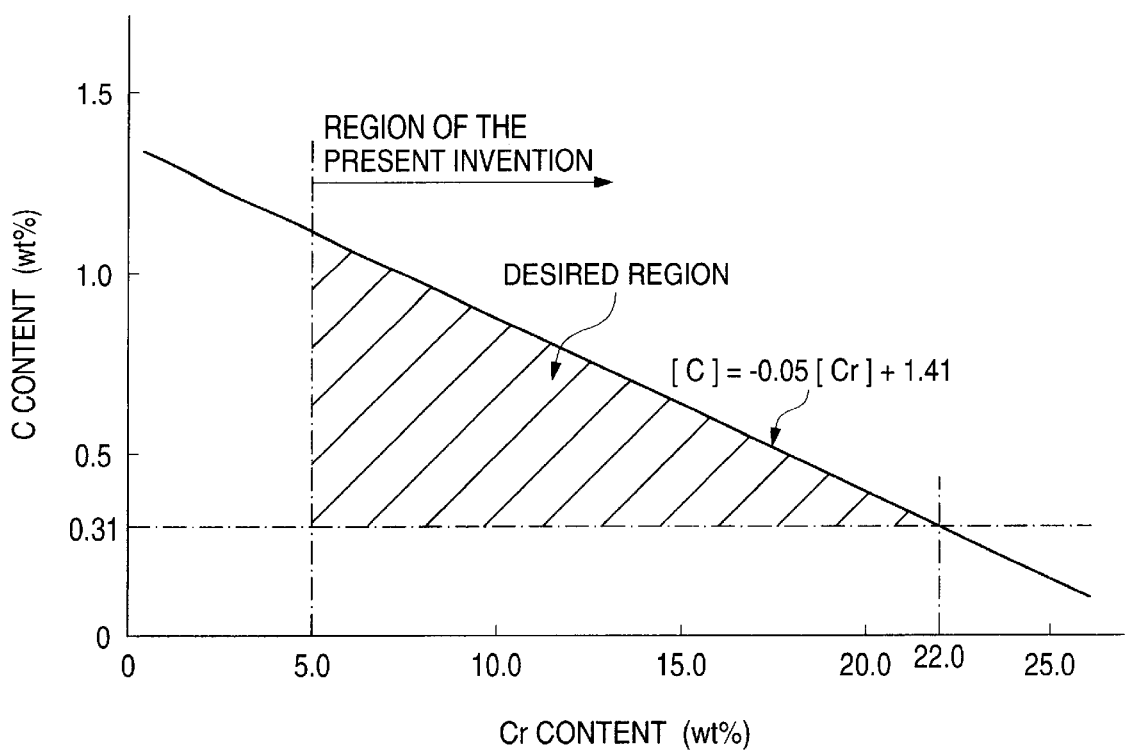
FIG. 5 is a graph illustrating the preferred range of the relationship between carbon content and chromium content of the steel material to be used in the first rolling bearing device according to the invention.

FIG. 5 is a graph illustrating a preferred range of the relationship between the content of carbon and the content of chromium in the steel material used in the first rolling bearing device according to the invention. In the invention, there is preferably used a steel material having the relationship between carbon content and chromium content falling within the region (shadow) defined by the line representing [Cr]=5.0 (% by weight), the line representing [Cr]=22.0 (% by weight), the line representing [C]×−0.05 [Cr]+1.41 and the line representing [C]=0.31 (% by weight) in the graph of FIG. 5. When the relationship between carbon content and chromium content falls within this region, the carbon content [C] is not lower than 0.45 (% by weight) and the chromium content [Cr] is not higher than 19.2 (% by weight), the surface hardness HRC of the steel material can be predetermined to be 60 or more.

In the case where a stainless steel other than martensite stainless steel (austenite stainless steel) is used, nitriding, carburizing, etc. can be effected to predetermine the surface hardness HRC of the steel material to be 58 or more.

When a material made of steel material (casted product) is worked, a working denatured layer (Beilby layer or layer composed of crushed crystal) is produced on the worked surface of the material. When an oxide film is formed directly on the worked surface of the steel material with the working denatured layer left unremoved by a method such as passivation, the resulting effect of recovering corrosion resistance is insufficient, possibly causing local corrosion of the oxide film in a corroding atmosphere. Further, even if it is tried to form an oxide film on the working denatured layer, the resulting oxide film has chromium atom and iron atom at a ratio (Cr/Fe) of less than 0.5 and a thickness of only from about 50 to 300 Å.

On the contrary, in accordance with the invention, the working denatured layer is removed before the formation of oxide film, making it possible to form an oxide film having chromium atom and iron atom at a ratio (Cr/Fe) of not lower than 0.5. A rolling bearing device comprising constituents having such an oxide film formed thereon is excellent in corrosion resistance, fretting resistance and seizing resistance.

The oxide film satisfying the relationship (Cr/Fe)$\geq$0.5 preferably has a thickness of not lower than 20 Å (1 nm), more preferably not lower than 15 Å (1.5 nm), even more preferably 40 Å (4 nm). The foregoing oxide film preferably has a Cr/Fe ratio of not lower than 0.7 on the surface side thereof.

The removal of the working denatured layer and the subsequent formation of the oxide film are accomplished by, e.g., the following method.

The worked surface of the worked material has cutting oil, grinding oil, press oil, rust-proofing, etc. attached thereto and thus is washed with an organic solvent or alkaline detergent. Subsequently, the worked material is subjected to electrolytic etching with itself as an anode and sulfuric acid, phosphoric acid, nitric acid or an aqueous solution containing one or more sodium or potassium salts thereof as an electrolytic solution under the application of an ultrasonic wave having a frequency of from 20 kHz to 100 kHz. In this manner, the working denatured layer can be removed. Subsequently, the worked material is dipped in a treatment containing chromic acid, sulfuric acid or nitric acid for a predetermined period of time to form an oxide film thereon.

The concentration of the electrolytic solution to be used in electrolytic etching is preferably from 50 to 150 g/l, if it is sulfuric acid or phosphoric acid, from 50 to 500 g/l, if it is nitric acid, or from 60 to 800 g/l, if it is a sodium or potassium salt. The electrolytic etching is preferably effected at a voltage of from 2 to 50 V with a current of from 0.1 to 50 A/dm$^2$ for 10 to 120 seconds.

The concentration of the treatment to be used in the formation of oxide film is from 15 to 300 g/l, if it is chromic acid, from 30 to 850 g/l, if it is sulfuric acid, or from 40 to 500 g/l, if it is nitric acid. The temperature of the treatment is from room temperature to 120° C. The dipping time is from 10 minutes to 120 minutes. By changing the temperature of the treatment and the dipping time, the thickness of the oxide film can be changed.

The greater the thickness of the oxide film satisfying the relationship (Cr/Fe)$\geq$0.5 is, the greater is the effect of improving corrosion resistance and fretting resistance. However, from the standpoint of cost of formation of oxide film, the thickness of the oxide film is preferably not greater 1,000 Å (100 nm), more preferably 720 Å (72 nm).

The worked material on which an oxide film has been formed is preferably subjected to electrolysis with the worked material as a cathode and with an aqueous solution containing chromic acid in a concentration of from 50 to 150 g/l, phosphoric acid in a concentration of from 0.1 to 10 g/l and/or sulfuric acid in a concentration of from 0.1 to 100 g/l, one or more selected from the group consisting of carbonate and sulfate of magnesium, calcium and barium in a supersaturated amount and a surface active agent as an electrolytic solution. The electrolysis is preferably effected at avoltage of from 0.1 to 20 V with a current of from 0.5 to 2 A/dm2 for 10 minutes to 300 minutes.

During this electrolysis, an extremely strong hydrogen atmosphere is formed around the worked material, which acts as a cathode. Accordingly, the surface of the worked material which has been subjected to electrolysis is more corrosion-resistant than the surface of the worked material which has not been subjected to electrolysis.

[Second Rolling Bearing Device]

In order to accomplish the second object of the invention, the present invention provides a rolling bearing device comprising as constituents provided interposed between a fixed body and a moving body rolling elements and race members having a race for said rolling elements fixed to the fixed body and the moving body, whereby the rolling movement of the rolling elements on the race allows the moving body to move relative to the fixed body, characterized in that at least one of the race members is obtained by working a material made of steel material comprising as alloying components C, Si, Cr, Mo, Ni, Co and V (by weight) in an amount of 0.2% or less (C), from not lower than 0.1% to not higher than 2.0% (Si), from not lower than 10.0% to not higher than 20.0% (Cr), from not lower than 0.4% to not higher than 3.0% (Mo), from not lower than 1.0% to not higher than 3.5% (Ni) , f rom not lower than 1.0% to not higher than 10.0% (Co) and from not lower than 0.4% to not higher than 2.0% (V), respectively, into a predetermined shape, subjecting the worked material to heat treatment involving carburizing or carbonitriding so that the carbon content in the surface portion of the race is from 1.0% to 3.0% by weight (by mass) and the surface hardness of the race is not lower than HRC 62, and then subjecting the material to finishing so that an oxide film having chromium atom and iron atom present therein at a ratio (Cr/Fe) of not lower than 0.5 is formed thereon to a thickness of not lower than 10 Å. This rolling bearing device is defined as second rolling bearing device of the invention.

Figure 6:
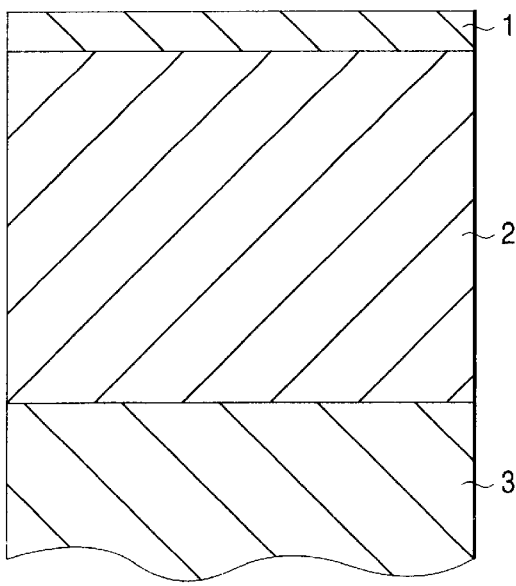
FIG. 6 is a diagram illustrating the sectional surface structure of the race member of the second rolling bearing device.

In other words, in the second rolling bearing device, the sectional surface structure of at least one race member comprises an oxide film 1 having a Cr/Fe ratio of 0.5 or more and a thickness of 10 Å (1 nm), a carburized or carbonitrided layer 2, and a core 3 in this order from the surface side thereof as shown in FIG. 6.

For the second rolling bearing device, at least one race member is obtained by working a material made of steel material having the foregoing formulation into a predetermined shape, and then subjecting the worked steel material to heat treatment involving carburizing or carbonitriding. The critical significance of the content of the various alloying components will be described hereinafter.

[C: not higher than 0.2% ]

When subjected to hardening, a steel comprising C (carbon) undergoes martensite transformation that gives hardness. The incorporation of C also exerts an effect of inhibiting the production of δ-ferrite, which deteriorates the toughness of the steel. However, when the hardened steel is tempered at a high temperature, the carbon content becomes a carbide that deteriorates the toughness of the steel. Therefore, the carbon content is preferably as low as 0.2% by weight or less, more preferably 0.10% by weight or less.

Instead of having a reduced carbon content, the second rolling bearing device comprises an austenite-stabilizing element such as Ni and Co incorporated therein to inhibit the production of δ-ferrite and hence provide the steel material with an excellent toughness.

[Si: from not lower than 0.1% to not higher than 2.0% ]

Si (silicon) is an element which acts as a deoxidizer during steel making as well as provides the steel with resistance to temper softening. When the content of Si falls below 0.1% by weight, these effects cannot be substantially exerted.

On the contrary, when the content of Si is too high, the resulting toughness is deteriorated. Therefore, the upper limit of the content of Si is predetermined to be 2.0% by weight.

[Mn: from not lower than 0.1% to not higher than 1.5%]

Mn (manganese) acts as a deoxidizer during steel making. When the content of Mn falls below 0.1% by weight, the desired effect cannot be substantially exerted. On the contrary, when the content of Mn is too high, the resulting forgeability and machinability are deteriorated. Further, when present with impurities such as S (sulfur) and P (phosphor), Mn deteriorates the corrosion resistance of the steel. Therefore, the content of Mn is predetermined to be 1.5% or less.

[Cr: from not lower than 10.0% to not higher than 20.0%]

Cr (chromium) is an element which renders the steel corrosion-resistant. When provided with a chromium content of not lower than 10.0%, the second rolling bearing device can be rendered highly corrosion-resistant.

On the contrary, when the content of Cr is too high, δ-ferrite, which deteriorates toughness, can be easily produced. Therefore, the upper limit of the content of Cr is predetermined to be 20.0% by weight.

[Mo: from not lower than 0.4% to not higher than 3.0%]

Mo (molybdenum) is an element which renders the steel more hardenable and resistant to temper softening and exerts an effect of remarkably improving the corrosion resistant of the steel. When the content of Mo falls below 0.4% by weight, the desired effects cannot be substantially exerted.

On the contrary, when the content of Mo is too high, the resulting toughness and workability are deteriorated. Therefore, the upper limit of the content of Mo is predetermined to be 3.0% by weight.

[Ni: from not lower than 1.0% to not higher than 3.5%]

Ni (nickel) is a strong austenite-stabilizing element and thus acts to inhibit the production of δ-ferrite and hence improve the toughness of the steel. In order to sufficiently exert these effects, the content of Ni is predetermined to be not lower than 1.0% by weight.

On the contrary, when the content of Ni is too high, the resulting austenite structure becomes too stable, making it impossible to obtain a sufficient hardness. Therefore, the upper limit of the content of Ni is predetermined to be 3.5% by weight.

[Co: from not lower than 1.0% to not higher than 10.0%]

Co (cobalt), too, is an austenite-stabilizing element and thus acts to inhibit the production of δ-ferrite and hence improve the toughness of the steel. In order to sufficiently exert these effects, the content of Co is predetermined to be not lower than 1.0% by weight. Further, since Co exerts a lower effect of stabilizing austenite structure than Ni, the content of Co is preferably not lower than 2.0%.

On the contrary, when the content of Co is too high, the resulting workability is deteriorated. Further, Co adds to material cost. Therefore, the upper limit of the content of Co is 10.0% by weight.

[V: from not lower than 0.4% to not higher than 2.0%]

V (vanadium) is a strong carbide- and nitride-forming element. A steel comprising V undergoes secondary hardening during tempering. Thus, V is an element for enhancing the hardness of the steel. When the content of V falls below, these effects cannot be substantially exerted.

On the contrary, when the content of V is too high, the resulting toughness and workability are deteriorated. Therefore, the content of V is predetermined to be not higher than 2.0% by weight.

In the second rolling bearing device, the carbon content in the surface portion of the race is from not lower than 1.0% by weight to not higher than 3.0% by weight, and the surface hardness HRC of the race is not lower than 62. The steel material thus treated is then subjected to finishing to form an oxide film thereon.

When the carbon content in the surface portion of the race falls below 1.0% by weight, sufficient hardness and high temperature properties cannot be obtained. When the content of carbon exceeds 3.0% by weight, an oxide film can be difficultly formed on the surface of the race. When the surface hardness HRC of the race falls below 62, the resulting rolling bearing device cannot be provided with a sufficiently long life when operated at a high temperature and a high rotary speed.

The comparison of carburizing with carbonitriding shows that carbonitriding exerts an effect of nitrogen to form finer carbides on the surface portion of the race than carburizing. Therefore, carbonitriding is preferably effected to provide longer rolling life and better corrosion resistance than carburizing even if the same carbon content is used. The depth of the hardened layer is properly predetermined such that $Y_0$ depth (depth at which Hv is 550 or more) is from about 0.8 mm to 2.5 mm, taking into account the bearing size or load.

For the second rolling bearing device, the oxide film is formed on the surface of the race such that the ratio of chromium atom to iron atom (Cr/Fe) is 0.5 or more and the thickness thereof is 10 Å (1.0 nm) or more. In this arrangement, a good corrosion resistance can be obtained. The ratio of chromium atom to iron atom (Cr/Fe) is preferably 0.7 or more, more preferably 1.0 or more. The thickness of the oxide film having a Cr/Fe ratio of 0.5 or more is preferably 15 Å (1.5 nm), more preferably 40 Å (4.0 nm). Even when the oxide film having a Cr/Fe ratio of 0.5 or more is formed to a thickness of more than 1,000 Å (100 nm), it merely adds to cost but exerts a saturated effect of improving corrosion resistance. The upper limit of the thickness of the oxide film having a Cr/Fe ratio of 0.5 or more is predetermined to be 1,000 Å (100 nm).

Further, the formation of this oxide film after the removal of the working denatured layer which has been formed after finishing makes it possible to form an oxide film with a chromium atom to iron atom ratio (Cr/Fe) of 0.5 or more having a good corrosion resistance. The removal of the working denatured layer and the formation of the oxide film can be accomplished by the same methods as described with reference to the first rolling bearing device.

Scales which have been produced during heat treatment are left behind on the unfinished area. Therefore, the heat treatment is preferably followed by chaffering or machining such as shot blasting and dry honing that removes scales. In this manner, the corrosion resistance of the unfinished area can be improved.

Embodiments of implication of the present invention will be described hereinafter.

[First Embodiment]

Alloy steels A to D comprising alloying components set forth in Table 1 below were prepared.

TABLE 1

| | Alloying components (% by weight) | | | | |
|---|---|---|---|---|---|
| | C + N | Si | Mn | Cr | JIS |
| A | 0.80 | 0.50 | 0.65 | 6.81 | |
| B | 0.60 | 0.31 | 0.29 | 13.02 | |
| C | 1.07 | 0.37 | 0.62 | 17.12 | SUS440C |
| D | 1.02 | 0.25 | 0.45 | 1.51 | SUJ2 |

Materials comprising these alloy steels were used to prepare inner ring (race member), outer ring (race member) and ball (rolling element) for single row deep groove ball bearing corresponding to nominal count 608.

Firstly, the steel materials were each subjected to cutting to a low precision. The steel materials thus cut were each then subjected to hardening and tempering under conditions suitable therefor to attain a surface hardness HRC of 58 or more. At this point, the worked material was measured for surface hardness. Subsequently, the worked material was subjected to finishing involving cutting, and then subjected to film forming according to the following methods (1) and (2). However, the steel material No. 1-11 comprising the alloy steel D, which has a small Cr content, was not subjected to film forming after finishing involving cutting.

<Film Forming Method (1)>

Firstly, the worked surface of the worked material was washed with an organic solvent. Subsequently, the worked material was subjected to electrolytic etching with itself as an anode in the manner described above to remove a working denatured layer from the surface thereof. Subsequently, the worked material was dipped in a treatment containing chromic acid and having a temperature of from room temperature to 60° C. to form an oxide film on the surface thereof. The thickness of the oxide film was varied by changing the time during which the worked material was dipped in the treatment. The ratio of chromium atom to iron atom (Cr/Fe) varies also with the content of chromium atom in the steel used. Thus, the greater the chromium content in the steel is, the greater is the chromium atom to iron atom ratio (Cr/Fe) of the oxide film.

<Film Forming Method (2)>

Firstly, the worked surface of the worked material was washed with an organic solvent. Subsequently, the worked material was dipped in a 50 wt-% nitric acid which had been kept at a temperature of 50° C. for 1 hour so that the surface thereof was passivated. In this manner, an oxide film was formed on the working denatured layer.

The worked material on which an oxide film had been formed was then analyzed by ESCA (X-ray photoelectron spectrophotometer) so that the surface thereof was vertically etched at a rate of 1 nm/min. In this manner, the oxide film formed on the surface of the worked material was vertically scanned for elementary analysis.

From the results of elementary analysis was then calculated the ratio of chromium atom and iron atom present in the depth of from 5 Å (0.5 nm) to 10 Å (1 nm) from the surface of the oxide film (Cr/Fe). The reason why the depth of from 5 Å (0.5 nm) to 10 Å (1 nm) from the surface of the oxide film was selected is that the uppermost portion of the oxide film is greatly affected by contamination. The results of elementary analysis were also used to determine the thickness of the oxide film which satisfies the relationship (Cr/Fe)≧0.5. These results are set forth in Table 2 below.

The inner ring, outer ring and ball thus prepared and a plastic retainer were then assembled into a single row deep groove ball bearing corresponding to nominal count 608. For each of these samples, some duplicates were assembled from inner ring, outer ring and ball prepared from the same materials in the same manner. As lubricants there were used a rust-proofing oil and a mineral oil-based grease.

The various rolling bearings thus assembled were each then examined for corrosion resistance and fretting resistance. For the evaluation of corrosion resistance, the samples were each subjected to salt spray test. In this salt spray test, the sample was sprayed with a 35° C. 5 wt-% aqueous solution of NaCl for 2 weeks according to JIS Z 2371. The samples thus tested were each then visually observed for the occurrence of corrosion on the various constituents of the rolling bearing. The results of evaluation of corrosion were then judged according to the following criterion. In other words, the symbol ⊚ indicates that no corrosion occurs. The symbol X indicates that a remarkable corrosion occurs. The symbol Δ indicates that a definite corrosion occurs but its degree is not remarkable. The 'symbol'○ indicates that a slight corrosion occurs.

For the evaluation of fretting resistance, the various rolling bearings were each operated at a pilot pressure of 1.2 kgf and a rotary speed of 1,800 rpm. Under these conditions, these rolling bearings were each measured for axial vibration acceleration (G value). The measurement of axial vibration acceleration was made 10 times. The measurements were then averaged. Subsequently, the various rolling bearings thus tested were each then subjected to vibration one million times at a pilot pressure of 1.2 kgf, a vibration angle of 2° and a vibration frequency of 27 Hz.

Subsequently, the various rolling bearings were each again operated at a pilot pressure of 1.2 kgf and a rotary speed of 1,800 rpm to measure axial vibration acceleration (G value) The measurement of axial vibration acceleration was made 10 times The measurements were then averaged. The average value of G obtained before vibration test was then subtracted from that obtained after vibration test to calculate the increase of G value (Δ G) due to vibration test. The smaller this increase (Δ G) is, the better is fretting resistance.

The structure of the various samples and the results of test on these samples are set forth in Table 2 below. In Table 2, the figures deviating from the scope of the invention are underlined. The relationship between ΔG (fretting resistance) and Cr/Fe of the surface portion of the oxide film (depth of from 5 to 10 Å from the surface thereof) and the relationship between ΔG (fretting resistance) and the thickness of oxide film satisfying the relationship (Cr/Fe)≧0.5 obtained from these results are graphically shown in FIGS. 1 and 2, respectively.

TABLE 2

| Sample No. | Type of steel | Surface hardness (HRC) | Film forming method | Oxide film | | Corrosion resistance | Fretting resistance (Δ G) |
| | | | | Cr/Fe on surface side | Thickness of oxide film satisfying Cr/Fe ≧ 0.5 (Å) | | |
| --- | --- | --- | --- | --- | --- | --- | --- |
| 1-1 | A | 61.3 | (1) | 0.7 | 15 | ○ | 3.6 |
| 1-2 | A | 61.3 | (1) | 1.1 | 40 | ⊚ | 1.9 |
| 1-3 | A | 61.3 | (1) | 1.9 | 120 | ⊚ | 0 |

TABLE 2-continued

| Sample No. | Type of steel | Surface hardness (HRC) | Film forming method | Cr/Fe on surface side | Oxide film Thickness of oxide film satisfying Cr/Fe ≧ 0.5 (Å) | Corrosion resistance | Fretting resistance (Δ G) |
|---|---|---|---|---|---|---|---|
| 1-4 | B | 61.1 | (1) | 1.3 | 45 | ⊚ | 0.7 |
| 1-5 | B | 61.1 | (1) | 2.1 | 240 | ⊚ | 0 |
| 1-6 | B | 61.1 | (1) | 3.7 | 720 | ⊚ | 0 |
| 1-7 | B | 61.1 | (1) | 0.6 | 10 | ○ | 13.7 |
| 1-8 | A | 61.3 | (1) | 0.3 | 0 | Δ | 24.3 |
| 1-9 | B | 61.1 | (2) | 0.3 | 0 | Δ | 20.7 |
| 1-10 | C | 60.8 | (2) | 0.2 | 0 | X | 24.1 |
| 1-11 | D | 61.3 | None | 0.1 | 0 | X | 36.9 |

*Film forming method (1): Dipping in a treatment containing chromic acid after removal of working denatured layer
Film forming method (2): Dipping in nitric acid without removing working denatured layer The relationship between the distance from the surface of the oxide film formed and (Cr/Fe) ratio of Sample Nos. 1-4, 1-5, 1-9 and 1-11 is graphically shown in FIG. 3. The relationship between the distance from the surface of the oxide film formed and the oxygen content of these samples is graphically shown in FIG. 4.

Figure 3:
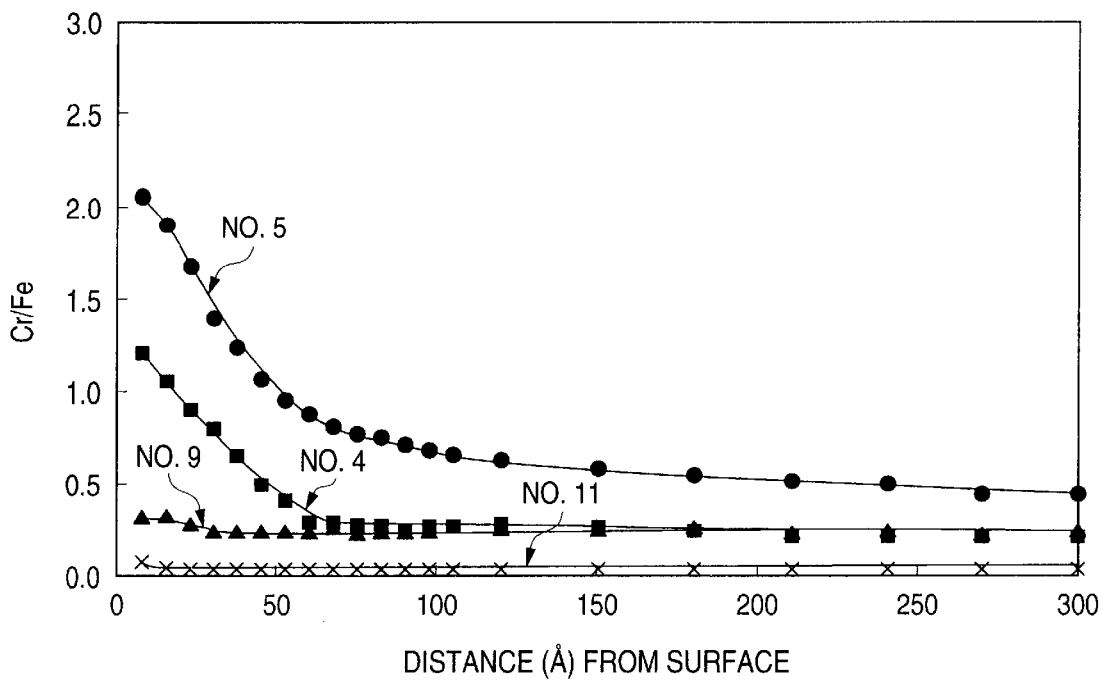
FIG. 3 is a graph illustrating the relationship between the distance from the surface of oxide film and Cr/Fe ratio of Sample Nos. 4, 5, 9 and 11 obtained in the first embodiment.
Figure 4:
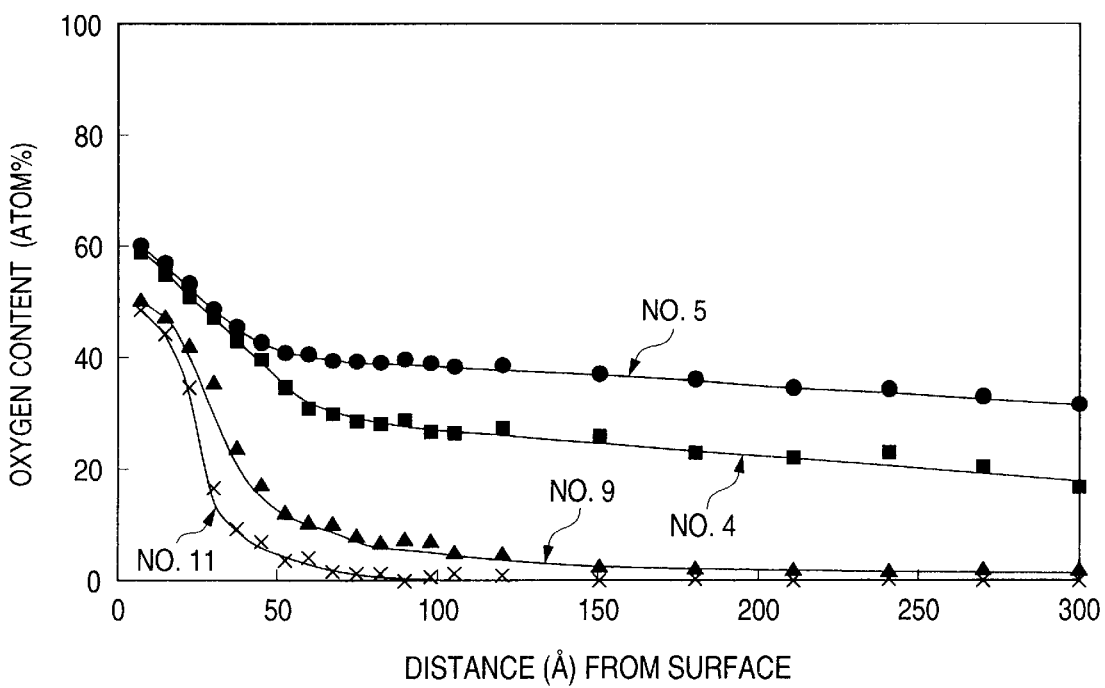
FIG. 4 is a graph illustrating the relationship between the distance from the surface of oxide film and the oxygen content of Sample Nos. 4, 5, 9 and 11 obtained in the first embodiment.

As can be seen in the graph of FIG. 3, Sample Nos. 1-4 and 1-5 were observed to have an oxide film satisfying the relationship (Cr/Fe)≧0.5 formed thereon. Further, Sample Nos. 1-9 and 1-11 were observed to have little or no vertical change of (Cr/Fe) ratio and have no oxide film satisfying the relationship (Cr/Fe)≧0.5 formed on the surface thereof. As can be seen in the graph of FIG. 4, Sample Nos. 1-4 and 1-5 had an oxide film formed thereon to a greater total thickness than Sample Nos. 1-9 and 1-11.

Figure 1:
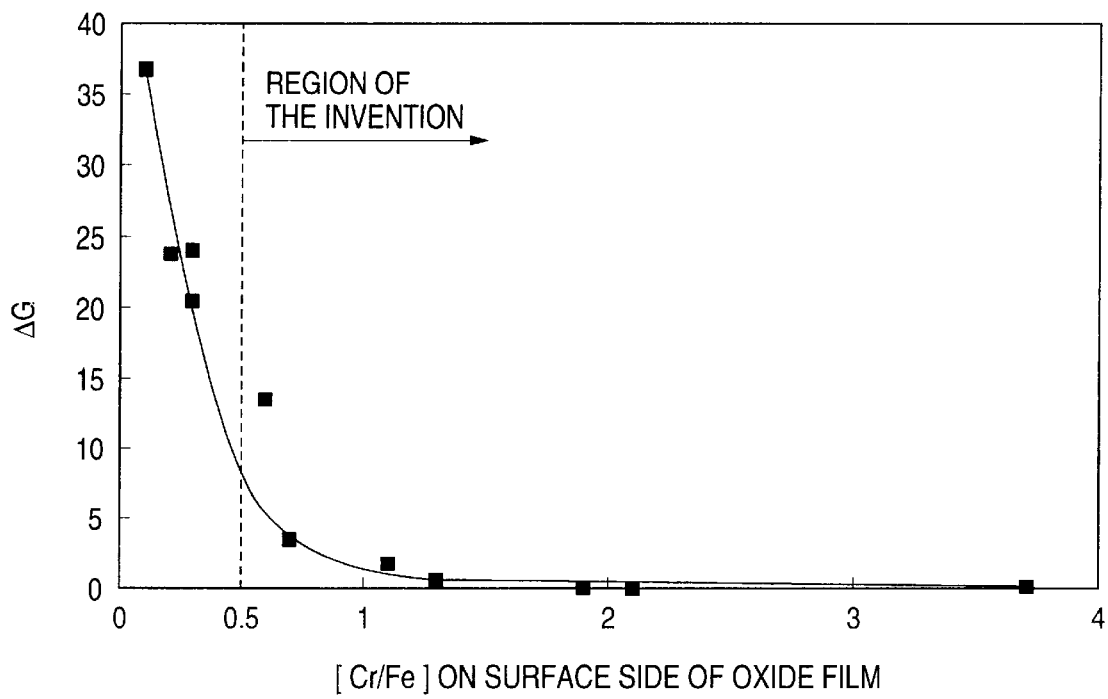
FIG. 1 is a graph illustrating the relationship between ΔG (fretting resistance) and Cr/Fe ratio on the surface side of oxide film obtained in the first embodiment.
Figure 2:
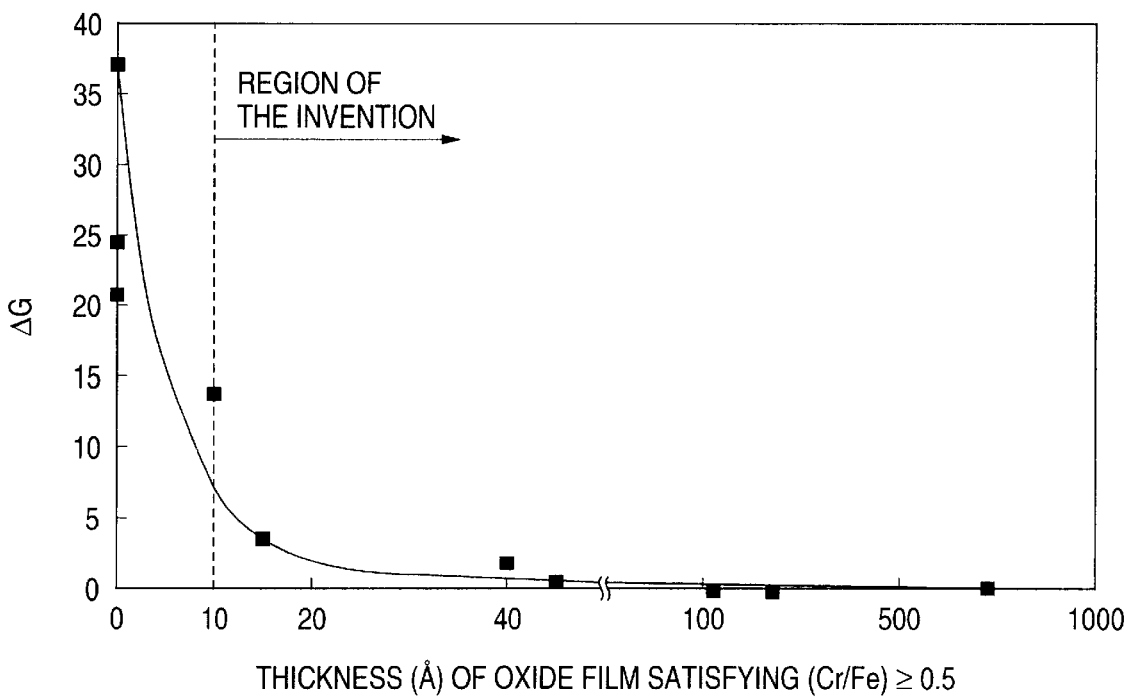
FIG. 2 is a graph illustrating the relationship between ΔG (fretting resistance) and the thickness of oxide film satisfying the relationship Cr/Fe≧0.5 obtained in the first embodiment.

Moreover, as can be seen in the graph of FIG. 1, when Cr/Fe ratio on the surface side of the oxide film is 0.5 or more (preferably 0.7 or more), the resulting fretting resistance is good. As can be seen in the graph of FIG. 2, when the thickness of the oxide film satisfying the relationship (Cr/Fe)≧0.5 is 10 Å (preferably 15 Å or more), the resulting fretting resistance is good.

Further, as can be seen in Table 2, the rolling bearings of Sample Nos. 1-1 to 1-7, which correspond to the example of the invention, are excellent in both corrosion resistance and fretting resistance. On the contrary, the rolling bearings of Sample Nos. 1-8 to 1-11, which correspond to the comparative example of the invention, are disadvantageous in at least any one of corrosion resistance and fretting resistance.

Sample Nos. 1-1 to 1-3 comprised the steel A, which has a chromium content as relatively small as 6.81% by weight. However, by subjecting the steel A to removal of working denatured layer and formation of oxide film satisfying the relationship (Cr/Fe)≧0.5, higher corrosion resistance and fretting resistance than Sample Nos. 1-9 and 1-10, which had been obtained from the steels B and C having a high chromium content free from removal of working denatured layer were obtained. The comparison of Sample Nos. 1-1 to 1-6 shows that Sample Nos. 1-4 to 1-6, which comprised the steel B having a high chromium content, had an oxide film having a higher Cr/Fe ratio than Sample Nos. 1-1 to 1-3, which comprised the steel A having a low chromium content, and thus exhibited remarkably excellent corrosion resistance and fretting resistance.

Sample No. 1-7 exhibited a Cr/Fe ratio as relatively low as 0.6 on the surface side of the oxide film and hence a slightly deteriorated fretting resistance as compared with Sample Nos. 1-2 to 1-7.

Sample Nos. 1-8 to 1-11 were obtained free of oxide film satisfying the relationship (Cr/Fe)≧0.5 without removing the working denatured layer and thus were poor in both corrosion resistance and fretting resistance.

The steel D has a chromium content as low as 1.51% by weight. Thus, the steel D can be hardly subjected to film formation. Further, an oxide film satisfying the relationship Cr/Fe≧0.5 can be hardly formed on the steel D. When the material made of steel C is used, it is made possible to form an oxide film satisfying the relationship Cr/Fe≧0.5 after the removal of working denatured layer from the worked material. However, since the material made of steel C has much coarse eutectic carbides having a major axis length of 20 μm or more present therein, rolling bearing devices comprising constituents made of steel C are not excellent in rolling life and stillness.

As can be seen in the foregoing description, when the thickness of the oxide film satisfying the relationship Cr/Fe≧0.5 formed on the surface of the steel material is from 10 Å to 720 Å, the resulting corrosion resistance is good. Further, when the thickness of the oxide film is from 15 Å to 720 Å, the resulting corrosion resistance is better.

In the foregoing embodiment, the inner and outer rings (race members) and the ball (rolling element) of rolling bearing are according to the constitution of the invention while the retainer is made of plastic. However, in the case where the retainer is made of steel material, it is preferred that the retainer, too, be according to the constitution of the invention. In the case of rolling bearing provided with a shield plate, it is preferred that the shield plate be made of steel according to the constitution of the invention. In this arrangement, corrosion on the area in clearance and galvanic corrosion can be further inhibited.

[Second Embodiment]

Alloy steels E to H comprising alloying components set forth in Table 3 below were prepared.

TABLE 3

| | Alloying components (% by weight) | | | | | | | | Symbol indicating type of |
|---|---|---|---|---|---|---|---|---|---|
| No | C | Si | Mn | Cr | V | Mo | Ni | Co | steel |
| E | 0.04 | 0.40 | 0.65 | 12.85 | 0.60 | 1.75 | 2.73 | 5.67 | |
| F | 0.80 | 0.35 | 0.32 | 3.82 | 1.04 | 3.85 | 0.04 | 0.00 | M50 |
| G | 0.15 | 0.18 | 0.27 | 3.86 | 1.15 | 3.85 | 3.42 | 0.00 | M50NiL |
| H | 1.02 | 0.35 | 0.59 | 17.12 | 0.00 | 0.40 | 0.07 | 0.00 | SUS440C |

Materials comprising these alloy steels were used to prepare inner ring (race member) and outer ring (race member) for single row deep groove ball bearing corresponding to nominal count 6206.

Firstly, the steel materials were each subjected to cutting to a low precision. The steel materials thus cut were each then subjected to any one of the following heat treatments (1) to (5).

Heat Treatment (1)

As a pretreatment there was effected a pre-oxidization treatment at a temperature of 950° C. for 1 to 2 hours. Thereafter, carburizing was effected at a temperature of from 900° C. to 920° C. for 48 to 72 hours. Subsequently, normalizing was effected twice at a temperature of from 1,080° C. to 1,120° C. for 1 to 2 hours. Subsequently, hardening was effected. In some detail, the steel material was kept at a temperature of 1,020° C. to 1,070° C. for 30 minutes, and then cooled in an oil. Thereafter, sub-zero treatment was effected at a temperature of −90° C. to −70° C. for 1 hour. Subsequently, tempering was effected twice at a temperature of from 460° C. to 520° C. for 2 hours.

Heat Treatment (2)

As a pretreatment there was effected a pre-oxidization treatment at a temperature of 950° C. for 1 to 2 hours. Thereafter, carbonitriding was effected with a 4% ammonia at a temperature of from 900° C. to 920° C for 48 to 72 hours. Subsequently, normalizing was effected twice at a temperature of from 1,080° C. to 1,120° C. for 1 to 2 hours. Subsequently, hardening was effected. In some detail, the steel material was kept at a temperature of 1,020° C. to 1,120° C. for 1.5 hours, and then cooled with gas. Thereafter, sub-zero treatment was effected at a temperature of −90° C. to −70° C. for 1 hour. Subsequently, tempering was effected twice at a temperature of from 460° C. to 520° C. for 2 hours.

Heat Treatment (3)

Neither pre-treatment nor carbonitriding or any other treatments was effected. Hardening was effected. In some detail, the steel material was kept at a temperature of from 1,020° C. to 1,070° C. for 30 minutes, and then cooled in an oil. Thereafter, sub-zero treatment was effected at a temperature of −90° C. to −70° C. for 1 hour. Subsequently, tempering was effected at a temperature of from 460° C. to 520° C. for 2 hours.

Heat Treatment (4)

Neither pre-treatment nor carbonitriding or any other treatments was effected. Hardening was effected. In some detail, the steel material was kept at a temperature of from 1,100° C. to 1,150° C. for 30 minutes, and then cooled in an oil. Thereafter, primary tempering was effected. In some detail, the steel material was air-cooled at a temperature of from 500° C. to 550° C. for 2 hours. Subsequently, sub-zero treatment was effected at a temperature of −90° C. to −70° C. for 1 hour. Subsequently, secondary tempering was effected twice at a temperature of from 500° C. to 550° C. for 2 hours.

Heat Treatment (5)

No pre-treatment was effected. Carbonitriding was effected at a temperature of 925° C. for 4 to 6 hours. Subsequently, hardening was effected. In some detail, the steel material was kept at a temperature of 1,120° C. for 30 minutes, and then cooled in an oil. Thereafter, primary tempering was effected. In some detail, the steel material was air-cooled at a temperature of from 500° C. to 550° C. for 2 hours. Subsequently, sub-zero treatment was effected at a temperature of −90° C. to −70° C. for 1 hour. Subsequently, secondary tempering was effected twice at a temperature of from 500° C. to 550° C. for 2 hours.

Subsequently, the steel material was subjected to finishing involving cutting. Thereafter, the steel material thus finished was subjected to film formation according to the film-forming method (1) described with reference to the first embodiment. However, Sample Nos. 2-5 to 2-8 were not subjected to film formation after finishing involving cutting. Sample No. 2-10 was observed to have the matrix eluted during film formation. Therefore, it was judged that Sample No. 2-10 cannot be subjected to film formation. Thus, Sample No. 2-10 was not subjected to film formation.

The various samples thus finished were each then measured for carbon content in the depth of 50 $\mu$m from the surface of the race (surface carbon concentration) by EPMA (electron probe microanalysis). The worked materials of Sample Nos. 2-1 to 2-4 and 2-9 were each measured for surface hardness after film formation. The worked materials of Sample Nos. 2-5 to 2-8 and 2-10 were each measured for surface hardness after finishing.

The worked materials of Sample Nos. 2-1 to 2-4 and 2-9 were each subjected to ESCA (X-ray photoelectron spectrophotometer) after film formation. The worked materials of Sample Nos. 2-5 to 2-8 and 2-10 were each subjected to ESCA (X-ray photoelectron spectrophotometer) after finishing. In this manner, the surface of the steel material was vertically etched at a rate of 1 nm/min. Thus, the oxide film formed on the surface of the worked material was vertically scanned for elementary analysis.

From the results of elementary analysis was then calculated the ratio of chromium atom and iron atom present in the depth of from 5 Å (0.5 nm) to 10 Å (1 nm) from the surface of the oxide film (Cr/Fe). The reason why the depth of from 5 Å (0.5 nm) to 10 Å (1 nm) from the surface of the oxide film was selected is that the uppermost portion of the oxide film is greatly affected by contamination. The results of elementary analysis were also used to determine the thickness of the oxide film which satisfies the relationship (Cr/Fe)$\geq$0.5. These results are set forth in Table 4 below.

The inner and outer rings thus prepared, a ball made of silicon nitride ($Si_3N_4$) and a retainer made of plastic were then assembled into a single row deep groove ball bearing corresponding to nominal count 6206. For each of these samples, some duplicates were assembled from inner ring and outer ring prepared from the same materials in the same manner. As a lubricant there was used "Jet Oil II" produced by Mobil Sekiyu K.K.

The various rolling bearings thus assembled were each then examined for corrosion resistance and bearing life at a high temperature and a high rotary speed. For the evaluation of corrosion resistance, salt spray test was effected. In this salt spray test, the sample was sprayed with a 35° C. 5 wt-% aqueous solution of NaCl for 48 hours according to JIS Z 2371. The samples thus tested were each then visually observed for the occurrence of corrosion on the various constituents of the rolling bearing. The results of evaluation of corrosion were then judged according to the following criterion. In other words, the symbol ⊙ indicates that no corrosion occurs. The symbol X indicates that a remarkable corrosion occurs. The symbol Δ indicates that a definite corrosion occurs but its degree is not remarkable.

For the evaluation of bearing life at a high temperature and a high rotary speed, the rolling bearing was operated at a temperature of 170° C., P/C of 0.71 and a rotary speed of 3,900 rpm. The time required until flaking occurs to make vibration five times the initial value was then measured as bearing life. The life of the various bearings were determined relative to that of Sample No. 2-5, which comprised M50, as 1 (life ratio).

Figure 7:
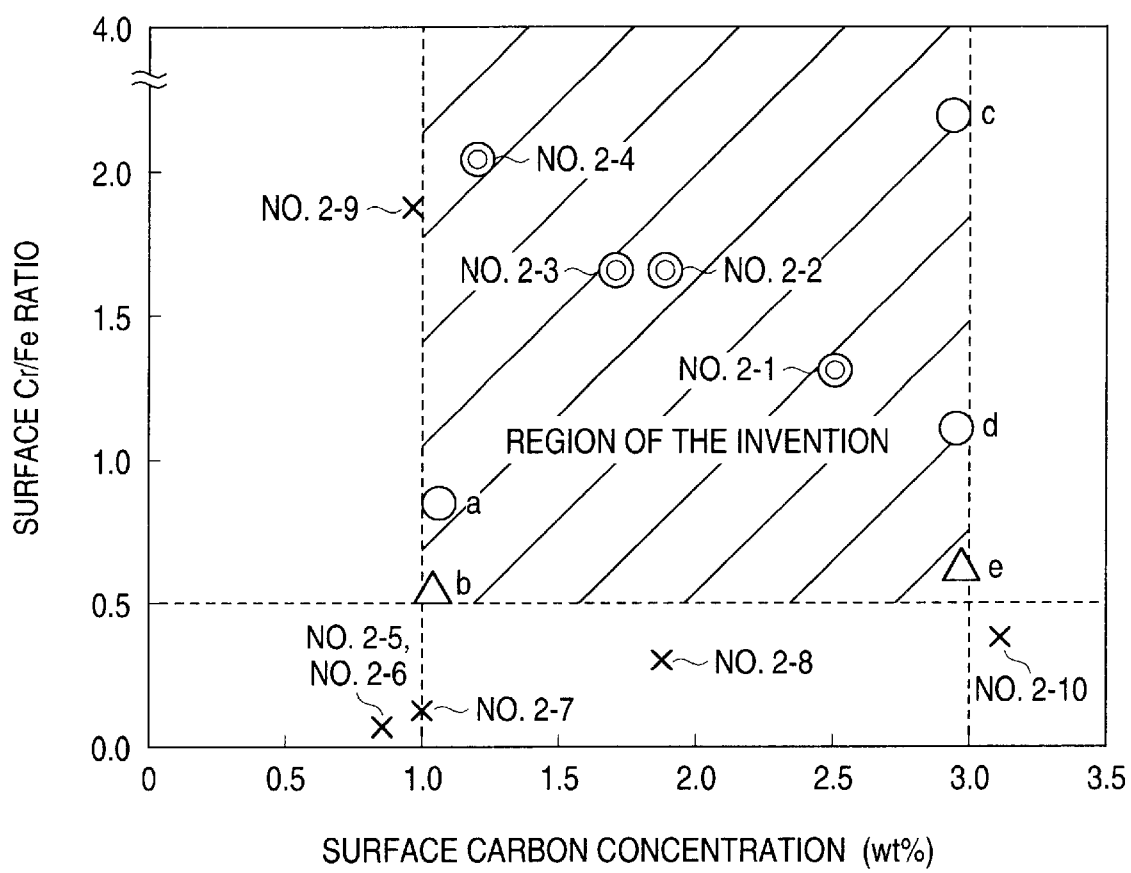
FIG. 7 is a graph illustrating the results obtained with the second embodiment.

The structure of the various samples and the results of test on these samples are set forth in Table 4 below. In Table 4, the figures deviating from the scope of the invention are underlined. These results are graphically shown in FIG. 7 with Cr/Fe ratio on the surface of the race as ordinate and with the carbon concentration of the surface of the race as abscissa. In this graph, the symbol ⊙ indicates that both "corrosion resistance: ⊙" and "life ratio: greater than 1.00" are satisfied. The symbol X indicates that at least one of these requirements is not satisfied.

Sample Nos. 2-1, 2-2 and 2-9 were obtained by subjecting the same steel material to the same heat treatment. However, the steel materials of Sample Nos. 2-1, 2-2 and 2-9were subjected to heat treatment for a period of time varying within the range described above to have different surface hardnesses, surface carbon concentrations and oxide film conditions. This applies also to Sample Nos. 2-3 and 2-4. Sample Nos. 2-3 and 2-4 were each subjected to carbonitriding. Sample Nos. 2-3 and 2-4 showed a surface nitrogen concentration of 0.06% by weight and 0.18% by weight, respectively.

invention were observed to have undergone no corrosion while the samples corresponding to the comparative example of the invention were observed to have undergone corrosion. Thus, the bearing corresponding to the example of the invention stays sufficiently corrosion-resistant even if sterilized and thus is found to be suitable for dental hand piece. Further, the bearing corresponding to the example of the invention has an oxide film having excellent sliding properties formed on the surface thereof ad thus is advantageous in torque and seizing resistance.

The foregoing various embodiments have been described with reference to rolling bearing as rolling bearing device. However, the present invention can be applied to rolling bearing devices other than rolling bearing (e.g., ball screw, linear guide). In a ball screw, the screw shaft acts as a race member on the fixed body side and the nut acts as a race member on the moving body side. In a linear guide, one of the guide rail and the slider acts as a race member on the fixed body side and the other acts as a race member on the moving body side.

TABLE 4

| Sample No. | Type of steel | Heat treatment | Film forming method | Surface hardness (HRC) | Surface carbon concentration (wt-%) | Cr/Fe on surface side | Oxide film Thickness of oxide film satisfying Cr/Fe ≧ 0.5 | Corrosion resistance | Life ratio |
|---|---|---|---|---|---|---|---|---|---|
| 2-1 | E | (1) | (1) | 66.2 | 2.50 | 1.3 | 45 Å | ⊙ | 3.01 |
| 2-2 | E | (1) | (1) | 63.8 | 1.81 | 1.7 | 60 Å | ⊙ | 3.17 |
| 2-3 | E | (2) | (1) | 63.5 | 1.67 | 1.7 | 70 Å | ⊙ | 3.47 |
| 2-4 | E | (2) | (1) | 63.5 | 1.18 | 2.1 | 120 Å | ⊙ | 3.26 |
| 2-5 | F | (4) | — | 62.8 | 0.80 | 0.1 | 0 | X | 1.00 |
| 2-6 | G | (5) | — | 62.4 | 0.80 | 0.1 | 0 | X | 1.34 |
| 2-7 | H | (3) | — | 56.8 | 1.02 | 0.2 | 0 | Δ ~ X | 0.41 |
| 2-8 | E | (1) | — | 63.8 | 1.81 | 0.3 | 0 | X | 2.89 |
| 2-9 | E | (1) | (1) | 60.1 | 0.96 | 1.9 | 65 Å | ⊙ | 0.92 |
| 2-10 | E | (1) | — | 66.3 | 3.10 | 0.4 | 0 | X | 2.84 |

As can be seen in these results, the rolling bearings of Sample Nos. 2-1 to 2-4, which correspond to the example of the invention, are excellent in both corrosion resistance and bearing life at a high temperature and a high rotary speed. On the contrary, the rolling bearings of Sample Nos. 2-5 to 2-10, which correspond to the comparative example of the invention, are disadvantageous in at least any of corrosion resistance and bearing life at a high temperature and a high rotary speed. Further, the rolling bearings of Sample Nos. 2-1 to 2-4 were superior to the rolling bearing of Sample No. 2-7, which comprised SUSU440C, in respect to corrosion resistance.

Specimens having a diameter of 18 mm and a diameter of 10 mm were then prepared. These specimens were then treated such that the surface carbon concentration and the surface Cr/Fe ratio varied to obtain Sample Nos. a to e. Sample Nos. a to e thus obtained were each then subjected to salt spray test in the same manner as mentioned above to evaluate the corrosion resistance thereof. The results of corrosion resistance thus evaluated are graphically shown in FIG. 7. The results of Sample Nos. a, c and D show no occurrence of corrosion and thus are plotted by the symbol ○ in the graph of FIG. 7. The results of Sample Nos. b and e show the occurrence of corrosion which is definite but not remarkable and thus are plotted by the symbol Δ in the graph of FIG. 7.

The various bearing samples of Table 4 were each kept in a 135° C. vapor (purified water) for 6 minutes, and then allowed to cool. This procedure was repeated 500 times. As a result, the samples corresponding to the example of the While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As mentioned above, the first rolling bearing device of the invention is excellent in corrosion resistance and fretting resistance. Further, the second rolling bearing device of the invention is excellent in corrosion resistance and bearing life at a high temperature and a high rotary speed.

Accordingly, the present invention provides a rolling bearing device having a high reliability suitable for precision machine, food-processing machine, facilities for producing semiconductor element or liquid crystal panel, medical examination equipment, medical equipment having a rotary portion such as dental hand piece, fishing equipment, etc. The present invention also provides a rolling bearing device having a high reliability suitable for aircraft jet engine, gas turbine and transmission.

What is claimed is:

1. A rolling bearing device comprising:
    a fixed body having a race;
    a moving body having a race; and
    a rolling elements rotatably interposed between said races of said fixed body and said moving body so as to make said moving body movable relative to said fixed body,
    wherein said at least one of said fixed body and said moving body is obtained by working a material made of iron alloy steel having a chromium (Cr) content of from equal or more than 5% by weight to equal or less than 22% by weight into a predetermined shape, and then subjecting the material to heat treatment followed by finishing, and then the race of at least one of said fixed body and said moving body thus finished has a surface hardness HRC 58 or more, and wherein an oxide film is formed on the race of said at least one of said fixed body and moving body and also comprises chromium atom and iron atom present therein at a ratio (Cr/Fe) of 0.5 or more.

2. The rolling bearing device according to claim 1, wherein the ratio (Cr/Fe) is 1.0 or more.

3. The rolling bearing device according to claim 1, wherein the thickness of said oxide film is 10 Å or more.

4. The rolling bearing device according to claim 2, wherein the thickness of said oxide film is 10 Å or more.

5. The rolling bearing device according to claim 1, wherein the thickness of said oxide film is 40 Å or more.

6. The rolling bearing device according to claim 2, wherein the thickness of said oxide film is 40 Å or more.

7. The rolling bearing device according to claim 1, wherein said alloy steel contains, 0.2 wt % or less by weight of C;
0.1% to 2.0% by weight of Si;
10.0% to 20.0% by weight of Cr;
0.4% to 3.0% by weight of Mo;
1.0% to 3.5% by weight of Ni;
1.0% to 10.0% by weight of Co; and
0.4% to 2.0% by weight of V.

8. The rolling bearing device according to claim 7, wherein said at least one of said fixed body and moving body has a surface portion disposed below said oxide film, the surface hardness of said surface portion is equal or more than HRC 62, and the carbon content in the surface portion is from 1.0% to 3.0% by weight.

9. The rolling bearing device according to claim 8, wherein the heat treatment includes carburizing or carbonitriding.

10. The rolling bearing device according to claim 8, wherein said oxide film has chromium atom and iron atom present therein at a ratio (Cr/Fe) of not lower than 0.5, and said oxide film has a thickness of not lower than 10 Å.

11. The rolling bearing device according to claim 1, wherein said steel material satisfying a following relationship:

$$[C] \leq -0.05[Cr]+1.41,$$

where [C] is the content of carbon (C) by weight, and the content of chromium (Cr) by weight.

12. A rolling bearing device comprising:

a fixed body having a race;

a moving body having a race;

a rolling elements rotatably interposed between said races of said fixed body and said moving body so as to make said moving body movable relative to said fixed body, wherein at least one of said fixed body and said moving body is obtained by working a material into a predetermined shape, said material being made of alloy steel containing, 0.2% or less by weight of C;
0.1% to 2.0% by weight of Si;
10.0% to 20.0% by weight of Cr;
0.4% to 3.0% by weight of Mo;
1.0% to 3.5% by weight of Ni;
1.0% to 10.0% by weight of Co; and
0.4% to 2.0% by weight of V, and being subjected to heat treatment including carburizing or carbonitriding followed by finishing, wherein said at least one of said fixed body and said moving body has a surface portion at its race, said surface portion having the carbon content from 1.0% to 3.0% by weight at its race, the surface hardness of said surface portion is equal or more than HRC 62, and an oxide film is formed on said at least one of said fixed body and moving body and also comprises chromium atom and iron atom present therein at a ratio (Cr/Fe) of not lower than 0.5, said oxide film having a thickness of not lower than 10 Å.

13. The rolling bearing device according to claim 12, wherein said steel material satisfying a following relationship:

$$[C] \leq -0.05[Cr]+1.41,$$

where [C] is the content [C] of carbon (C) by weight, and the content [Cr] of chromium (Cr) by weight.

* * * * *